United States Patent
Müller

(10) Patent No.: US 7,614,606 B2
(45) Date of Patent: Nov. 10, 2009

(54) COMPRESSOR FOR A DIAPHRAGM VALVE

(75) Inventor: Fritz Müller, Ingelfingen (DE)

(73) Assignee: Gemü Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 10/842,253

(22) Filed: May 10, 2004

(65) Prior Publication Data
US 2004/0262563 A1 Dec. 30, 2004

(30) Foreign Application Priority Data
May 13, 2003 (DE) .................. 203 07 457 U

(51) Int. Cl.
*F16K 1/00* (2006.01)
(52) U.S. Cl. .................. 251/331; 92/103 R; 92/103 SD
(58) Field of Classification Search .................. 251/331; 92/103 SD, 103 R
See application file for complete search history.

(56) References Cited

U.S. PATENT DOCUMENTS

| | | | | | |
|---|---|---|---|---|---|
| 2,654,559 | A * | 10/1953 | Franck | ........................ | 251/331 |
| 2,702,686 | A * | 2/1955 | Fortune | .................... | 251/335.2 |
| 2,710,629 | A * | 6/1955 | Hector Price Richard | ... | 251/331 |
| 2,777,029 | A * | 1/1957 | Hall Langstroth | ......... | 200/83 B |
| 2,891,763 | A * | 6/1959 | Fortune | ....................... | 251/333 |
| 3,521,674 | A * | 7/1970 | Dodson et al. | ......... | 137/625.48 |
| 3,623,700 | A * | 11/1971 | Boteler | ........................ | 251/331 |
| 3,631,882 | A * | 1/1972 | White, Jr. | .................... | 137/312 |
| 3,703,910 | A * | 11/1972 | Smith | ........................ | 137/375 |
| 4,086,036 | A * | 4/1978 | Hagen et al. | ............. | 417/413.1 |
| 4,333,632 | A * | 6/1982 | Smith | .......................... | 251/214 |
| 4,475,713 | A * | 10/1984 | Reed et al. | ................... | 251/214 |
| 4,569,641 | A * | 2/1986 | Falk et al. | .................... | 417/417 |
| 4,720,079 | A * | 1/1988 | Iizuka et al. | ................. | 251/331 |
| 4,773,832 | A * | 9/1988 | Muck | ........................ | 417/437 |
| 4,883,412 | A * | 11/1989 | Malizard et al. | ............ | 417/387 |
| 4,901,751 | A * | 2/1990 | Story et al. | .................. | 137/312 |
| 5,074,757 | A * | 12/1991 | Horn | ........................... | 417/63 |
| 5,112,027 | A * | 5/1992 | Hanyu et al. | ................. | 251/331 |
| 5,295,662 | A * | 3/1994 | Yamaji et al. | ............... | 251/331 |
| 5,560,279 | A * | 10/1996 | Connors et al. | ............... | 92/5 R |
| 5,699,717 | A * | 12/1997 | Riedlinger | .................. | 92/98 R |
| 5,743,169 | A * | 4/1998 | Yamada | ....................... | 92/100 |
| 5,820,105 | A * | 10/1998 | Yamaji et al. | ................ | 251/368 |
| 6,089,532 | A * | 7/2000 | Rohloff et al. | ............. | 251/61.4 |
| 6,508,266 | B2 * | 1/2003 | Iritani et al. | ................. | 137/312 |

FOREIGN PATENT DOCUMENTS

DE  3546117 C1 *  2/1987

OTHER PUBLICATIONS

Elbert, Glenn. "Friction", The Physics Hypertextbook, 1998-2005, Available online http://hypertextbook.com/physics/mechanics/friction/.*
Elert, Glenn. "Coefficients of Friction for Teflon", The Physicis Factbook, 2004, Available online http://hypertexttbook.com/facts/2004/GarvinTam.shtml.*

* cited by examiner

*Primary Examiner*—John Rivell
*Assistant Examiner*—Andrew J Rost
(74) *Attorney, Agent, or Firm*—Henry M. Feiereisen; Ursula B. Day

(57) ABSTRACT

A compressor for operating a diaphragm of polymer material for a diaphragm valve includes a base body having a diaphragm-proximal surface, and a material layer at least partially provided on the diaphragm-proximal surface and having a very low coefficient of friction.

5 Claims, 2 Drawing Sheets

COMPRESSOR FOR A DIAPHRAGM VALVE

CROSS-REFERENCES TO RELATED APPLICATIONS

This application claims the priority of German Patent Application, Serial No. 203 07 457.2, filed May 13, 2003, pursuant to 35 U.S.C. 119(a)-(d), the disclosure of which is incorporated herein by reference.

BACKGROUND OF THE INVENTION

The present invention relates, in general, to a compressor for operating a membrane of a diaphragm valve.

A diaphragm valve of a type involved here includes a diaphragm acted upon by a compressor for opening and closing as the diaphragm is pressed against a valve stem of a valve body. The diaphragm may be made, for example, of polymer material. Normally, the compressor is made of metal and is moved by an adjustment drive in such a manner that the diaphragm is deflected by the compressor against the valve stem for closing the diaphragm valve. In open position of the diaphragm valve, the diaphragm is deflected away from the valve stem, as the compressor moves in a direction away from the valve stem. In diaphragm valves of this type, the compressor touches the diaphragm to thereby deflect it. During opening, the compressor executes a partial roll-off motion and is pushed away from the diaphragm.

The polymer diaphragm is a sensitive component of the diaphragm valve and is exposed to increased wear as a result of local overstretching caused by the pressure applied by the compressor and as a result of frictional forces between the compressor and the diaphragm. Friction between the compressor and the diaphragm decreases also the operating force applied by the compressor so that the operation of the diaphragm valve requires an increase in the applied operating force. Wear of the diaphragm and local overstretching thereof reduces the service life of the diaphragm.

It would therefore be desirable and advantageous to provide an improved compressor for operating a membrane of a diaphragm valve to obviate prior art shortcomings and to provide a longer service life of the diaphragm while reducing a friction between the compressor and the diaphragm.

SUMMARY OF THE INVENTION

According to one aspect of the present invention, a compressor for operating a diaphragm of polymer material for a diaphragm valve includes a base body having a diaphragm-proximal surface, and a material layer at least partially provided on the diaphragm-proximal surface and having a very low coefficient of friction.

The present invention resolves prior art problems by providing a material layer of very low coefficient of friction so that the friction between the compressor and the diaphragm is reduced and wear of the diaphragm is less during operation of the diaphragm valve. The provision of such a material layer also more effectively exploits the pressure forces applied by the compressor for deflecting the diaphragm against the valve stem of the valve body. As a consequence, contact between the diaphragm and the valve stem is improved. In addition, risk of local overstretching of the elastomer of the diaphragm is reduced so that overall the service life is significantly extended when taking into account reduced wear, more effective use of the pressure force, and prevention of local overstretching.

According to another feature of the present invention, the material layer may be made of polytetrafluoroethylene (Teflon). Although the use of polytetrafluoroethylene is currently preferred, other materials are conceivable as well so long as they have a very low coefficient of friction.

To ensure clarity, it is necessary to establish the definition of the term "very low coefficient of friction" that will be used throughout this disclosure. The term "very low coefficient of friction" relates hereby to material with a coefficient of friction in the range of 0.04 to 0.3. Polytetrafluoroethylene, for example, has a coefficient of friction of 0.04.

According to another feature of the present invention, the material layer may be disposed at least in an area of the stem of the diaphragm valve for deflecting the diaphragm. In other words, the material layer is provided in the area of greatest pressure application upon the diaphragm, when the diaphragm valve assumes the closed position. Therefore, the compressor can be precisely constructed to include the material layer upon those areas that are exposed to greatest stress. Suitably, the material layer may be placed in the base body so that the base body acts as carrier for the material layer.

According to another feature of the present invention, the material layer may be constructed as formed body for providing the diaphragm-proximal surface, with the formed body being firmly secured to the base body. In this way, the compressor has a two-part construction, in which the base body may, e.g., be made of metal, and assumes the function of a carrier for the material layer as formed body which covers at least the area that interacts with the diaphragm of the diaphragm valve.

According to another feature of the present invention, the diaphragm-proximal surface of the base body may be, at least partially, coated with the material layer. Currently preferred is however to coat the diaphragm-proximal surface of the base body entirely with the material layer. A coating of the diaphragm-proximal surface of the base body is cost-efficient and easy to provide and also provides the compressor with properties of very low coefficient of friction so that wear of the diaphragm can be entirely reduced.

According to another feature of the present invention, the material layer is molded around the base body, e.g. with PFA (perfluoralkoxy). Molding the material layer around the compressor is also easy to implement and cost-efficient.

The present invention is thus based on the recognition to at least construct those areas of the compressor that come in direct contact with the diaphragm during opening and closing of the diaphragm valve with a very low coefficient of friction. As a result, the service life of the diaphragm valve is prolonged and the diaphragm can be operated by the compressor with little friction.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
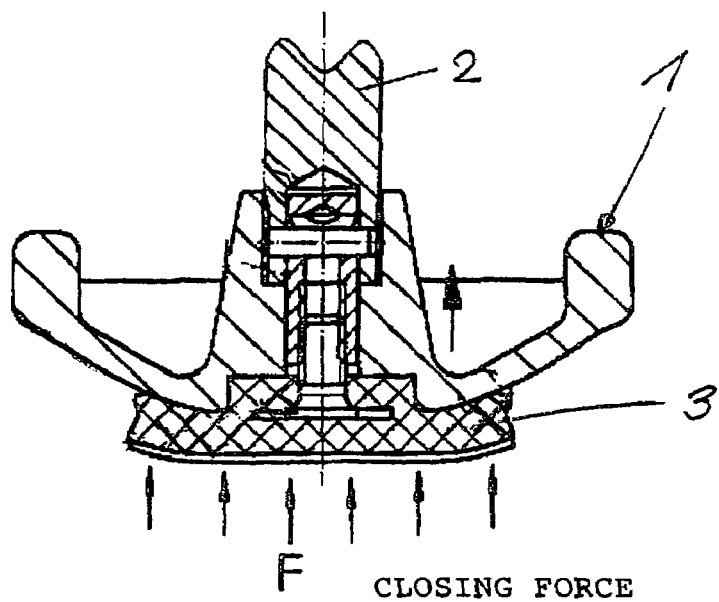
FIG. 1 is a fragmentary schematic sectional view of a diaphragm valve with illustration of a compressor according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a fragmentary schematic sectional view of a diaphragm valve having a compressor, generally designated by reference numeral 1 and made, for example, of metal. The compressor 1 is connected to an adjustment device 2, shown only schematically, for actuating the compressor 1 to act upon a diaphragm 3, made for example of polymer material so that the diaphragm 3 is pushed against a valve stem 10 (FIG. 4b) of a valve element to close the diaphragm valve by a closing force F in a direction indicated by the arrows. The diaphragm 3 is hereby compressed. Opening of the diaphragm valve is implemented by moving the compressor 1 away from the valve stem 10 to relieve the diaphragm 3 which thus detaches from the valve stem 10. As shown in FIG. 1, at least part of the surface of the compressor 1 interacts with the diaphragm 3. Operation of a diaphragm valve is generally known so that a detailed discussion thereof is omitted for the sake of simplicity.

Figure 2:
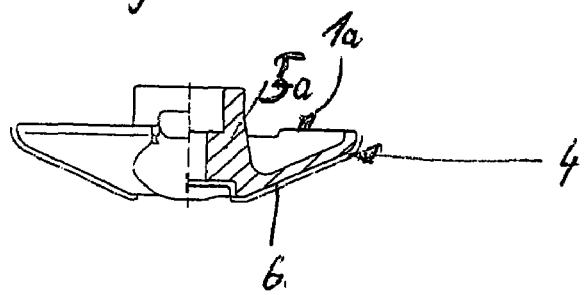
FIG. 2 is a schematic, partly cross-sectional view of a variation of a compressor for the diaphragm valve of FIG. 1.

Referring now to FIG. 2, there is shown a schematic, partly cross-sectional view of a variation of a compressor for use in the diaphragm valve. In the following description, parts corresponding with those in FIG. 1 will be identified by corresponding reference numerals followed by an "a". In this embodiment, provision is made for a compressor 1a which has a base body 5a provided on its side proximal to the diaphragm 3 with a slip coat 4. Suitably, the slip coat 4 is made of PFA which is molded around the base body 5a. As a result, the surface of the base body 5a is provided with a material layer 6 having a very low coefficient of friction, e.g. in the range of 0.1 to 0.3.

Figure 3:
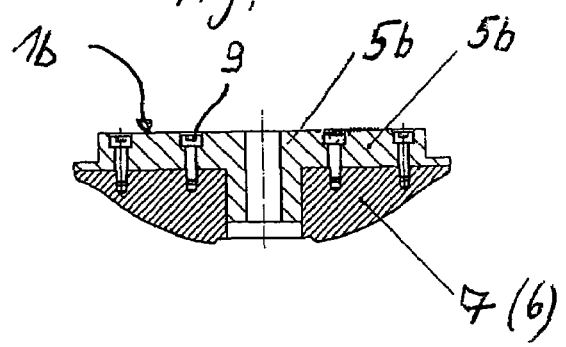
FIG. 3 is a schematic, partly sectional view of another variation of a compressor for the diaphragm valve of FIG. 1.

FIG. 3 shows is a schematic, partly sectional view of another variation of a compressor for use in the diaphragm valve. Parts corresponding with those in FIG. 1 will be identified by corresponding reference numerals followed by a "b". In this embodiment, provision is made for a compressor 1b which has a base body 5b serving as carrier for a formed body 7 to provide the material layer 6 with very low coefficient of friction. The formed body 7 provides hereby the surface of the compressor 1 for interaction with the diaphragm 3 and is firmly secured to the base body 5b by means of countersunk bolts 9. The compressor 1b of FIG. 3 is thus comprised of the base body 5b and the attached formed body 7 that defines the material layer 6 with very low coefficient of friction. An example of a suitable material for the material layer 6 includes polytetrafluoroethylene that has a coefficient of friction of 0.04.

Figure 4:
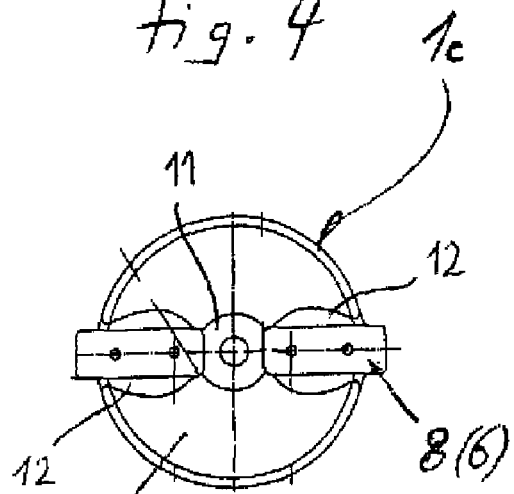
FIG. 4 is a side view of still another variation of a compressor for the diaphragm valve of FIG. 1.
Figure 4A:
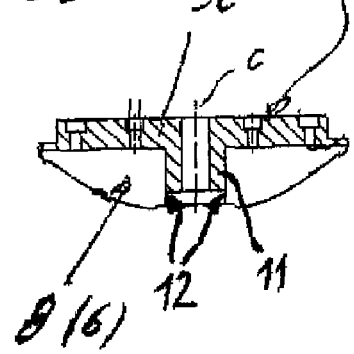
FIG. 4a is a plan view of the compressor of FIG. 4.
Figure 4B:
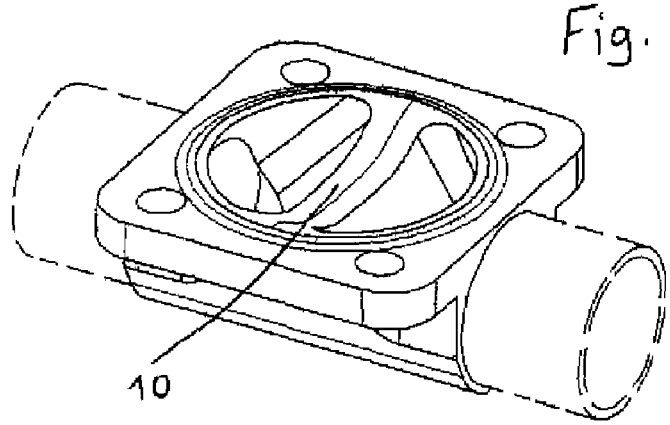
FIG. 4b is a perspective view of a detail of the diaphragm valve, depicting a valve stem.

Referring now to FIG. 4, there is shown a side view of yet another variation of compressor for use in the diaphragm valve. Parts corresponding with those in FIG. 1 will be identified by corresponding reference numerals followed by a "c". In this embodiment, provision is made for a compressor 1c which includes a base body 5c which defines a center axis C and which is formed with a pocket to receive an insert 8 of material layer 6 with very low coefficient of friction. This is shown in particular in FIG. 4a which is a plan view of the compressor 1c and depicts the presence of a web 11 in coaxial disposition to the center axis C and grooves 12 on opposite sides of the web 11 of the pocket for receiving inserts 8. The inserts 8 are provided in particular in the region of the diaphragm-proximal surface of the compressor 1c that is pushed against the valve stem 10 of the valve element in the closed position of the diaphragm valve. This surface region of the compressor 1c is the critical zone which is subjected to greatest stress.

Common to all compressors 1, 1a, 1b, 1c is that at least part of the surface of the base body 5, 5a, 5b, 5c is formed by a material layer 6 with very low coefficient of friction so that wear of the diaphragm 3 against the valve stem 10 of the valve element can be reduced. When the diaphragm 3 is pushed against the valve stem 10, applied pressure forces can be effectively exploited for pressure upon the diaphragm 3 because of the material layer 6 with very low coefficient of friction. Friction during relative movement of the diaphragm 3 and the compressor 1, 1a, 1b, 1c during operation of the diaphragm valve for opening and closing can be reduced, thereby preventing local overstretching of the elastomer material of the diaphragm 3. As a result the service life of the diaphragm 3 is prolonged and the diaphragm valve is able to reliable operate over a long period.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A diaphragm valve, comprising:
   a valve body having a stem;
   a diaphragm movable in relation to the stem, said diaphragm being made of polymer material and having a fluid-distal surface;
   a compressor for moving the diaphragm between an open position in which the diaphragm is detached from the stem and a closed position in which the diaphragm is pressed against the stem, said compressor including a base body defining a center axis and having a diaphragm-proximal surface, said base body being configured on the diaphragm-proximal surface to define first and second grooves on opposite sides of the center axis; and
   inserts received in the first and second grooves in one-to-one correspondence and forming a material layer in confronting relationship to the fluid-distal surface, said inserts being made of polytetrafluoroethylene.

2. The diaphragm valve of claim 1, wherein the material layer has a coefficient of friction in the range of 0.04 to less than 0.05.

3. The diaphragm valve of claim 1, wherein the insert is disposed at least in an area of the base body confronting the stem of the valve body for deflecting the diaphragm.

4. The diaphragm valve of claim 1, wherein the base body is made of metal.

5. The diaphragm valve of claim 1, wherein the base body is formed with a web extending from the diaphragm-proximal surface of the base body in coaxial disposition with the center axis in a direction of the diaphragm to demarcate the first and second grooves on opposite sides thereof.

\* \* \* \* \*